US 8,061,610 B2

(12) United States Patent
Nunnink

(10) Patent No.: US 8,061,610 B2
(45) Date of Patent: Nov. 22, 2011

(54) SYSTEM AND METHOD FOR EMPLOYING COLOR ILLUMINATION AND COLOR FILTRATION IN A SYMBOLOGY READER

(75) Inventor: Laurens Nunnink, Simpelveld (NL)

(73) Assignee: Cognex Technology and Investment Corporation, Mt. View, CA (US)

( * ) Notice: Subject to any disclaimer, the term of this patent is extended or adjusted under 35 U.S.C. 154(b) by 1147 days.

(21) Appl. No.: 11/257,410

(22) Filed: Oct. 24, 2005

(65) Prior Publication Data

US 2007/0091332 A1  Apr. 26, 2007

(51) Int. Cl.
*G06K 7/10* (2006.01)
(52) U.S. Cl. ............ 235/454; 235/462.01; 235/462.24
(58) Field of Classification Search .......... 235/454, 235/462.01, 462.24; 358/3.01, 518
See application file for complete search history.

(56) References Cited

U.S. PATENT DOCUMENTS

| | | | |
|---|---|---|---|
| 5,359,185 A | | 10/1994 | Hanson |
| 5,420,712 A * | | 5/1995 | Maeda et al. ............ 359/196.1 |
| 5,714,745 A | | 2/1998 | Ju et al. |
| 6,633,375 B1 | | 10/2003 | Veith et al. |
| 6,834,807 B2 | | 12/2004 | Ehrhart et al. |
| 6,970,608 B1 | | 11/2005 | Michael |
| 7,025,271 B2 | | 4/2006 | Dvorkis et al. |
| 7,028,901 B2 | | 4/2006 | Carlson |
| 7,163,149 B2 * | | 1/2007 | He et al. ........................ 235/454 |
| 7,617,984 B2 | | 11/2009 | Nunnink |
| 7,823,783 B2 | | 11/2010 | Gerst et al. |
| 7,823,789 B2 | | 11/2010 | Nunnink |
| 2003/0062413 A1 | | 4/2003 | Gardiner et al. |
| 2005/0011956 A1 * | | 1/2005 | Carlson .................... 235/462.42 |
| 2005/0168729 A1 | | 8/2005 | Jung et al. |
| 2006/0072158 A1 * | | 4/2006 | Christie .................... 358/3.01 |
| 2007/0090193 A1 | | 4/2007 | Nunnink |

FOREIGN PATENT DOCUMENTS

DE  4108916  9/1992

(Continued)

OTHER PUBLICATIONS

The PCT Search Report, PCT/US2006/041045, pp. 1-16, dated Oct. 19, 2006.
Office action and response for Chinese patent application 200680048946.9, office action dated Jun. 10, 2010, Response to Office action dated, Oct. 25, 2010.

(Continued)

*Primary Examiner* — Daniel Hess

(57) ABSTRACT

This invention provides a system and method for employing and analyzing images that are illuminated in different colors depending upon the type of illumination being employed. In an illustrative embodiment, a color image sensor is used to acquire images of subjects of interest, and each of the direct bright field, dark field and diffuse illumination are transmitted to the surface simultaneously (concurrently with each other) in a discrete illumination color that is discretely discernable by the sensor. For example, direct bright field and dark field may be red, while diffuse may be blue. Pixels of the same sensitivity (for example, red and blue) in the image sensor receive only the image generated by that color of illumination. The reader of this invention includes processing components that independently assemble images from red and blue pixel addresses to create, in effect two simultaneous images (one image generated using a combination dark field and direct bright field and the other image generated using diffuse illumination) that overlap (are registered with respect to each other) perfectly. The best image is determined using conventional image analysis tools, and meaningful data (the code of the read symbol, for example) is derived from that best image.

36 Claims, 9 Drawing Sheets

FOREIGN PATENT DOCUMENTS

| | | |
|---|---|---|
| DE | 10134974 | 7/2001 |
| EP | 0516927 | 3/1992 |
| JP | 9-62831 | 3/1997 |
| JP | 2002-12379 | 4/2002 |
| WO | 0217216 | 2/2002 |
| WO | 2005043449 | 5/2005 |
| WO | 2006065619 | 6/2006 |

OTHER PUBLICATIONS

Japanese Patent application, office action dated, Dec. 7, 2010, (with English translation).

Japanese Patent application 2008-537,813, office action dated, Mar. 28, 2011, (English translation).

* cited by examiner

SYSTEM AND METHOD FOR EMPLOYING COLOR ILLUMINATION AND COLOR FILTRATION IN A SYMBOLOGY READER

BACKGROUND OF THE INVENTION

1. Field of the Invention

This invention relates to machine vision systems and symbology readers that employ machine vision and more particularly to illuminators for the same.

2. Background Information

Machine vision systems use image acquisition devices that include camera sensors to deliver information on a viewed subject. The system then interprets this information according to a variety of algorithms to perform a programmed decision-making and/or identification function. For an image to be most-effectively acquired by a sensor in the visible, and near-visible light range, the subject should be properly illuminated.

In the example of symbology reading (also commonly termed "barcode" scanning) using an image sensor, proper illumination is highly desirable. Symbology reading entails the aiming of an image acquisition sensor (CMOS camera, CCD, etc.) at a location on an object that contains a symbol (a "barcode"), and acquiring an image of that symbol. The symbol contains a set of predetermined patterns that represent an ordered group of characters or shapes from which an attached data processor (for example a microcomputer) can derive useful information about the object (e.g. its serial number, type, model, price, etc.). Symbols/barcodes are available in a variety of shapes and sizes. Two of the most commonly employed symbol types used in marking and identifying objects are the so-called one-dimensional barcode, consisting of a line of vertical stripes of varying width and spacing, and the so-called two-dimensional barcode consisting of a two-dimensional array of dots or rectangles.

By way of background FIG. 1 shows an exemplary scanning system 100 adapted for handheld operation. An exemplary handheld scanning appliance or handpiece 102 is provided. It includes a grip section 104 and a body section 106. An image formation system 151, shown in phantom, can be controlled and can direct image data to an onboard embedded processor 109. This processor can include a scanning software application 113 by which lighting is controlled, images are acquired and image data is interpreted into usable information (for example, alphanumeric strings derived from the symbols (such as the depicted two-dimensional barcode image 195). The decoded information can be directed via a cable 111 to a PC or other data storage device 112 having (for example) a display 114, keyboard 116 and mouse 118, where it can be stored and further manipulated using an appropriate application 121. Alternatively, the cable 111 can be directly connected to an interface in the scanning appliance and an appropriate interface in the computer 112. In this case the computer-based application 121 performs various image interpretation/decoding and lighting control functions as needed. The precise arrangement of the handheld scanning appliance with respect to an embedded processor, computer or other processor is highly variable. For example, a wireless interconnect can be provided in which no cable 111 is present. Likewise, the depicted microcomputer can be substituted with another processing device, including an onboard processor or a miniaturized processing unit such as a personal digital assistant or other small-scale computing device.

The scanning application 113 can be adapted to respond to inputs from the scanning appliance 102. For example, when the operator toggles a trigger 122 on the hand held scanning appliance 102, an internal camera image sensor (within the image formation system 151) acquires an image of a region of interest 131 on an object 105. The exemplary region of interest includes a two-dimensional symbol 195 that can be used to identify the object 105. Identification and other processing functions are carried out by the scanning application 113, based upon image data transmitted from the hand held scanning appliance 102 to the processor 109. A visual indicator 141 can be illuminated by signals from the processor 109 to indicate a successful read and decode of the symbol 195.

In reading symbology or other subjects of interest, the type of illumination employed is of concern. Where symbology and/or other viewed subjects are printed on a flat surface with contrasting ink or paint, a diffuse, high-angle "bright field" illumination may best highlight these features for the sensor. By high-angle it is meant, generally, light that strikes the subject nearly perpendicularly (normal) or at an angle that is typically no more than about 45 degrees from perpendicular (normal) to the surface of the item being scanned. Such illumination is subject to substantial reflection back toward the sensor. By way of example, barcodes and other subjects requiring mainly bright field illumination may be present on a printed label adhered to an item or container, or on a printed field in a relatively smooth area of item or container.

Conversely, where a symbology or other subject is formed on a more-irregular surface, or is created by etching or peening a pattern directly on the surface, the use of highly reflective bright field illumination may be inappropriate. A peened/etched surface has two-dimensional properties that tend to scatter bright field illumination, thereby obscuring the acquired image. Where a viewed subject has such decidedly two-dimensional surface texture, it may be best illuminated with dark field illumination. This is an illumination with a characteristic low angle (approximately 45 degrees or less, for example) with respect to the surface of the subject (i.e. an angle of more than approximately 45 degrees with respect to normal). Using such low-angle, dark field illumination, two-dimensional surface texture is contrasted more effectively (with indents appearing as bright spots and the surroundings as shadow) for better image acquisition.

In other instances of applied symbology a diffuse direct illumination may be preferred. Such illumination is typically produced using a direct-projected illumination source (e.g. light emitting diodes (LEDs)) that passes through a diffuser to generate the desired illumination effect.

To take full advantage of the versatility of a camera image sensor, it is desirable to provide bright field, dark field and diffuse illumination. However, dark field illumination must be presented close to a subject to attain the low incidence angle thereto. Conversely, bright field illumination is better produced at a relative distance to ensure full area illumination.

Commonly assigned U.S. patent application Ser. No. 11/014,478, entitled HAND HELD SYMBOLOGY READER ILLUMINATION DIFFUSER and U.S. patent application Ser. No. 11/019,763, entitled LOW PROFILE ILLUMINATION FOR DIRECT PART MARK READERS, both by Laurens W. Nunnink, the teachings of which are expressly incorporated herein by reference, provide techniques for improving the transmission of bright field (high angle) and dark field (low angle) illumination. These techniques include the provision of particular geometric arrangements of direct, bright field LEDs and conical and/or flat diffusers that are placed between bright field illuminators and the subject to better spread the bright field light. The above-incorporated HAND HELD SYMBOLOGY READER ILLUMINATION DIFFUSER further teaches the use of particular colors for improving the illumination applicable to certain types of surfaces. However, it has been observed that the choice of bright field, dark field, direct or diffuse light is not intuitive to user for many types of surfaces and/or the particular angles at which the reader is directed toward them. In other words, a surface may appear to be best read using dark field illumination, but in practice, bright field is preferred for picking out needed details, especially at a certain viewing angle. Likewise, with handheld readers, the viewing angle is never quite the same from surface to surface (part-to-part) and some viewing angles be better served by bright field while other may be better served by dark field.

The reader may be directed to step through various types of illumination when reading each part, but this takes time, both in cycling each set of illuminators on and off and integrating/analyzing the resulting image. Currently, for a reader to be considered efficient, the reading process should take place within 200 milliseconds or less. Stepping through illumination types, storing results, comparing and deriving the best image may exceed desired time limits. It is, therefore highly desirable to provide a technique that allows the best form of illumination to be employed at once for all types of surfaces and scan angles, and for acquired images from this illumination to be used immediately to derive meaningful image data.

SUMMARY OF THE INVENTION

This invention overcomes the disadvantages of the prior art by providing a system and method for employing and analyzing images that are illuminated in different colors depending upon the type of illumination being employed. In an illustrative embodiment, a color image sensor is used to acquire images of subjects of interest, and each of the direct bright field, dark field and diffuse illumination are transmitted to the surface simultaneously (concurrently with each other) in a discrete illumination color that is discretely discernable by the sensor. For example, direct bright field and dark field may be red, while diffuse may be blue. Pixels of the same sensitivity (for example, red and blue) in the image sensor receive only the image generated by that color of illumination. An appropriate filter, in line with the particular illumination source (LEDs, for example) may be employed to generate one or more discrete color and/or attenuate inadvertent migration of non-diffuse-color light into the diffuser portion. The reader of this invention includes processing components that independently assemble images from red and blue pixel addresses to create, in effect two simultaneous images (one image generated using a combination dark field and direct bright field and the other image generated using diffuse illumination) that overlap (are registered with respect to each other) perfectly. The best image is determined using conventional image analysis tools, and meaningful data (the code of the read symbol, for example) is derived from that best image. In a further embodiment, the best parts of one or more images can be combined to derive the symbolic data. In addition, another set of discrete-color light transmitters (green LEDs, for example) can be used to transmit direct bright field, and this direct bright field light can be discriminated by appropriate green-sensitivity pixels in the image sensor, thereby deriving a third discrete image that is registered with respect to the other two discrete-color images.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
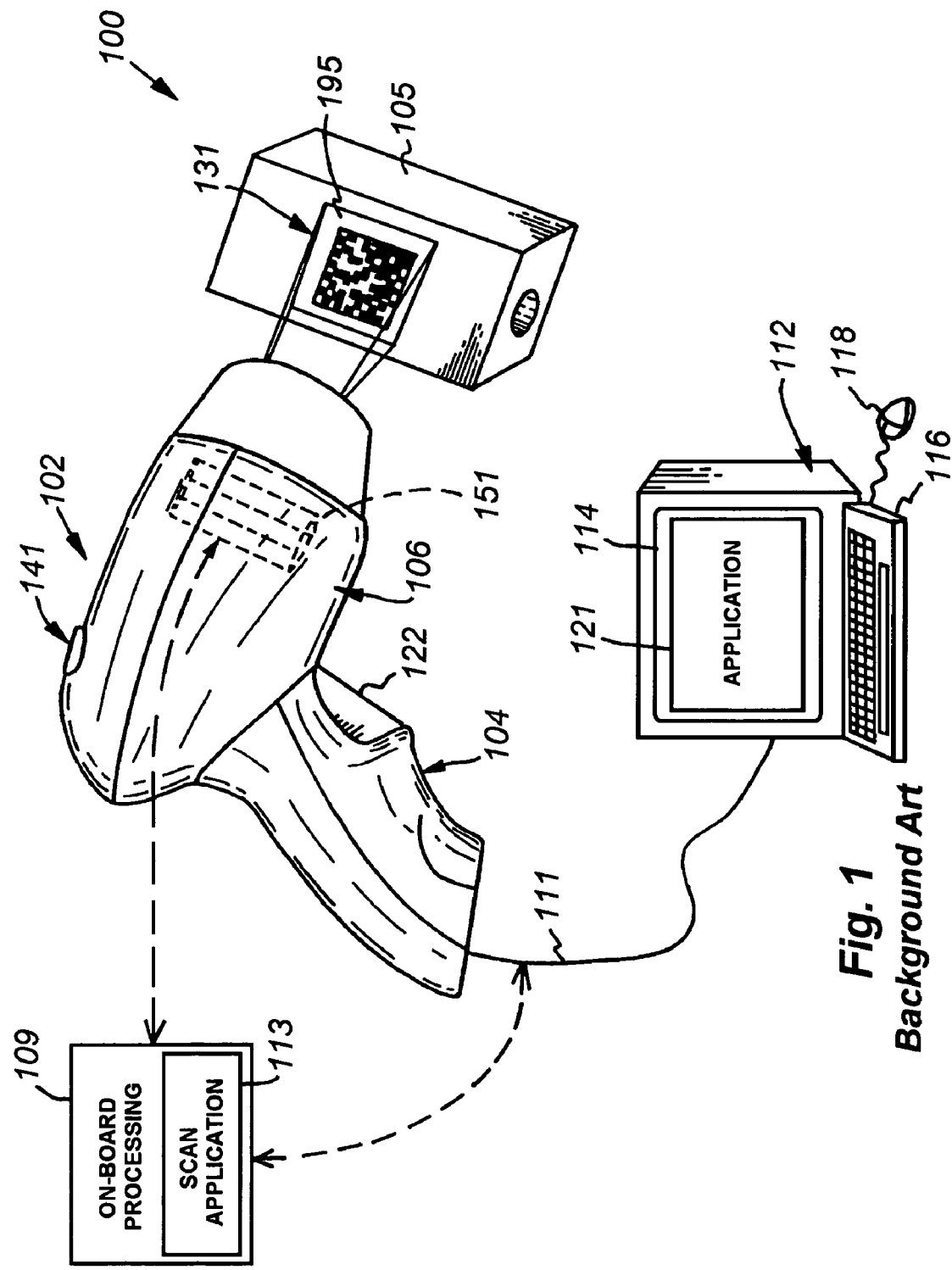
FIG. 1, already described, is a perspective view of a handheld scanning system with integrated illumination according to the prior art.
Figure 2:
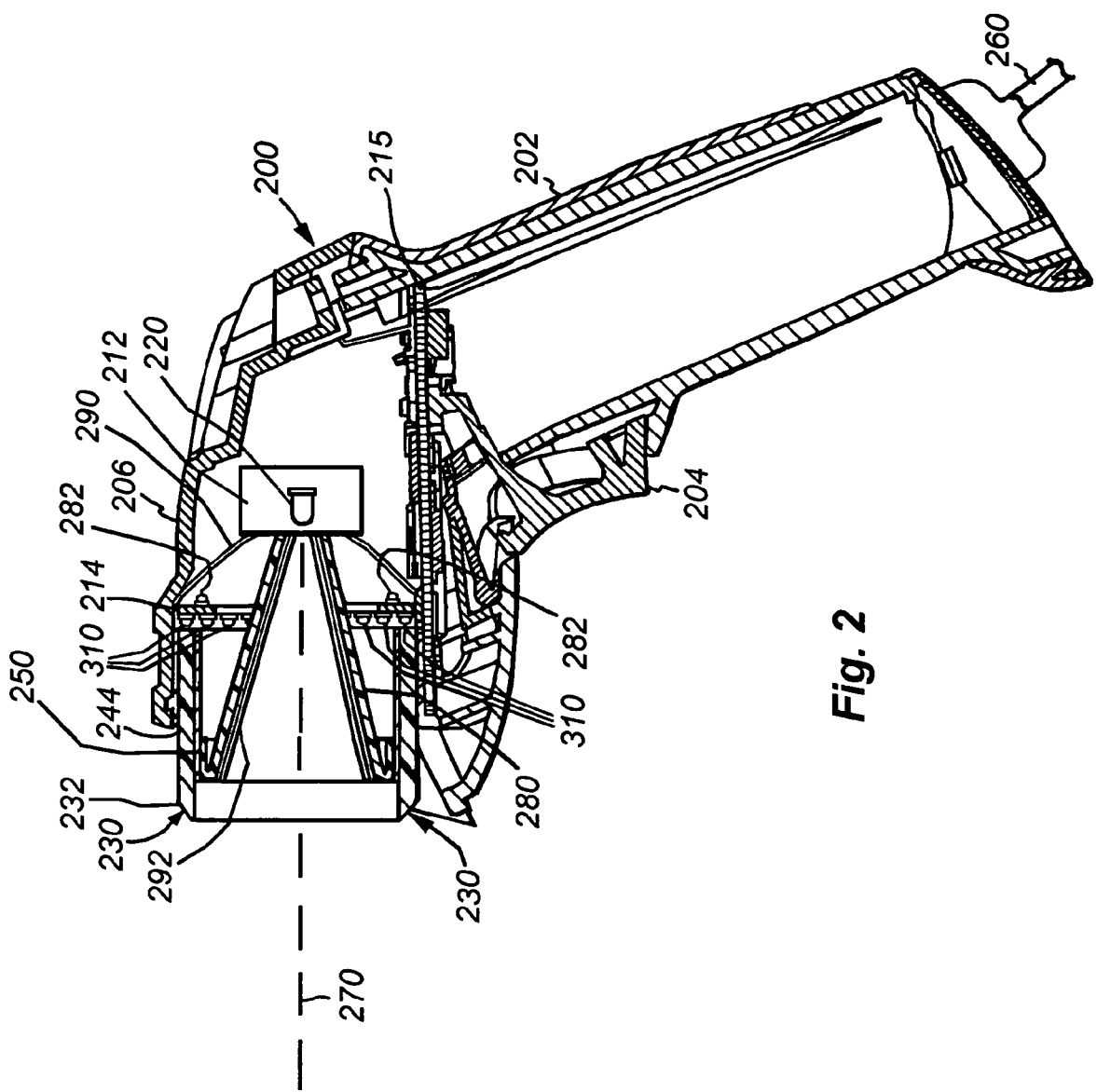
FIG. 2 is a side cross section of a handheld scanning system that can be employed in connection with the teachings of this invention.

FIG. 2 shows a cross sectional side view of an illustrative embodiment of the reader 200 according to the present invention. The imager 212 and an illumination board 214 are positioned on a shock-resistant mounting (not shown) within the housing 206. In this exemplary embodiment, the processor module and related functional electronic components are mounted on a processor board 215. The grip portion 202 and the trigger 204 are functionally cooperative with the housing 206 and components of the processor board 215. The grip portion 206 includes a conveniently placed trigger 204 that can be actuated by a finger of the user to initiate the image acquisition and decoding function. More particularly, pressing the trigger causes all types and colors of illumination (as described further below) to be simultaneously projected onto the subject of interest, and also causes corresponding acquisition of an image by the imager.

With brief reference to the illuminator, the illumination board 214 supports a plurality of LEDs 310 that are red in this embodiment (a variety of colors can be used). The LEDs 310 are directed forwardly, toward the opening of the reader. These LEDs are positioned behind a passive light pipe 244 that internally transmits light from the ring of LEDs 310 to a front end 230. In this embodiment, the front end 230 includes a chamfered surface 232. Various examples of a light pipe for use with a reader or similar application are shown and described in U.S. patent application Ser. No. 10/693,626, entitled LIGHT PIPE ILLUMINATION SYSTEM AND METHOD, by William H. Equitz, et al., the teachings of which are expressly incorporated herein by reference.

Briefly explained, light passes through the extended body of the pipe 244 from the inner end, adjacent to the LEDs 310. The body is formed from a transmissive/transparent substance, such as polymethyl methacrylate (PMMA) or polycarbonate. The transmitted light is reflected internally by the angled/chamfered surface 232 of the light pipe 244 to exit at a low angle toward the center optical axis 270. The inner and/or outer wall surfaces of the light pipe 244 can be coated with opaque paint or another compound to prevent leakage of light into or out of the pipe. In this example, a shield 250 is also provided along the inner surface of the light pipe. One function of the shield 250 is to prevent transmission of diffuse light (described below) in to the light pipe. Another function is to redirect light transmitted from the reflector (see below) back into the diffuser.

In this example, the ring of LEDs 310 acts to produce a red direct bright field effect along with the dark field effect through refraction of some light from the LEDs through the chamfered surface 232. In general, at short reading distances from a surface (<25 mm between the light pipe distal (forward) end 230 and surface), the bright field illumination from the light pipe 230 tends not to interfere with the dark field illumination. The bright field illumination is available, however, for larger reading distances (>25 mm between the end 230 and the surface). This is useful for easy-to-read codes, such as black-and-white printed labels. In alternate embodiments, a separate bright field illuminator can be provided, and as described below. In fact, many available imagers include integral red bright field illuminators. In an alternate embodiment, a separate bright field illuminator can be provided in a discrete color, such as green.

Note that a pair of aiming LEDs 220 (typically emitting green light) are provided. However, these are optional. Such aiming LEDs may be integral with the commercially available image employed herein.

A tether cord 260 provides electrical power to the reader 200, as well as a communication transmission path for the decoded character string of the encoded information, though it is contemplated that the reader 200 can be configured with battery power and wireless communication for complete portable flexibility.

Figure 3:
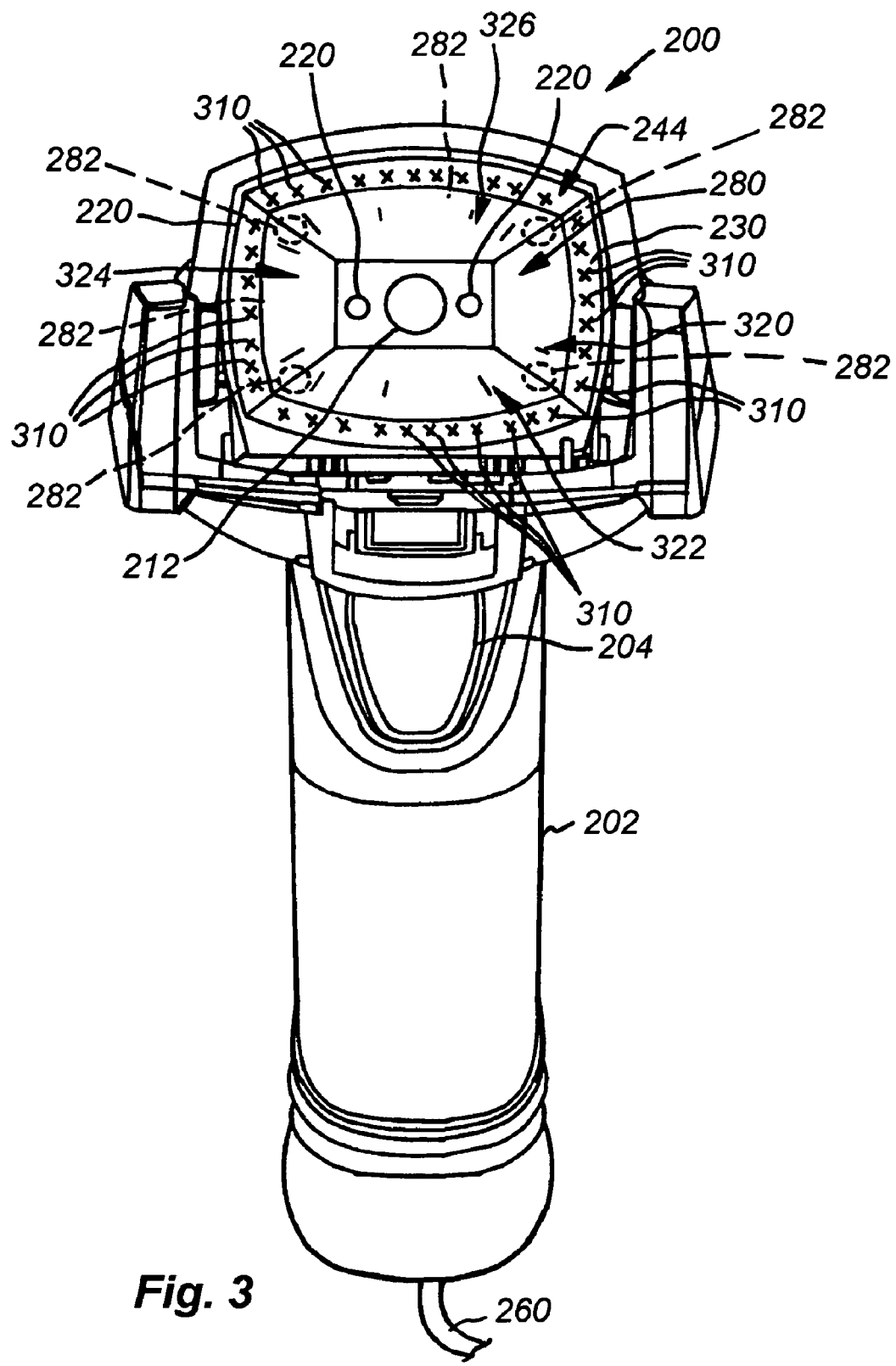
FIG. 3 is a front view of the scanning system of FIG. 2.

With reference also to FIG. 3, a front view of the reader 200 is shown. The distribution and placement of the individual LEDs (or other appropriate light elements) 310 that transmit light to the light pipe 244 is represented by a series of adjacent Xs positioned around the perimeter of the light pipe 244 in line with the distal end 230. The illustrative LED placement creates a generally uniform lighting effect. The placement of these light elements and others used herein is highly variable. In addition, the addressing of light elements can be controlled so that only certain elements are activated at certain times to create the desired overall dark field illumination intensity and/or bias (e.g. lighter on one side than another) to the dark field illumination effect on the subject. This variable-addressing feature is discussed in further detail in the above-incorporated U.S. patent applications and in other commonly assigned U.S. patent applications referenced therein.

Figure 4:
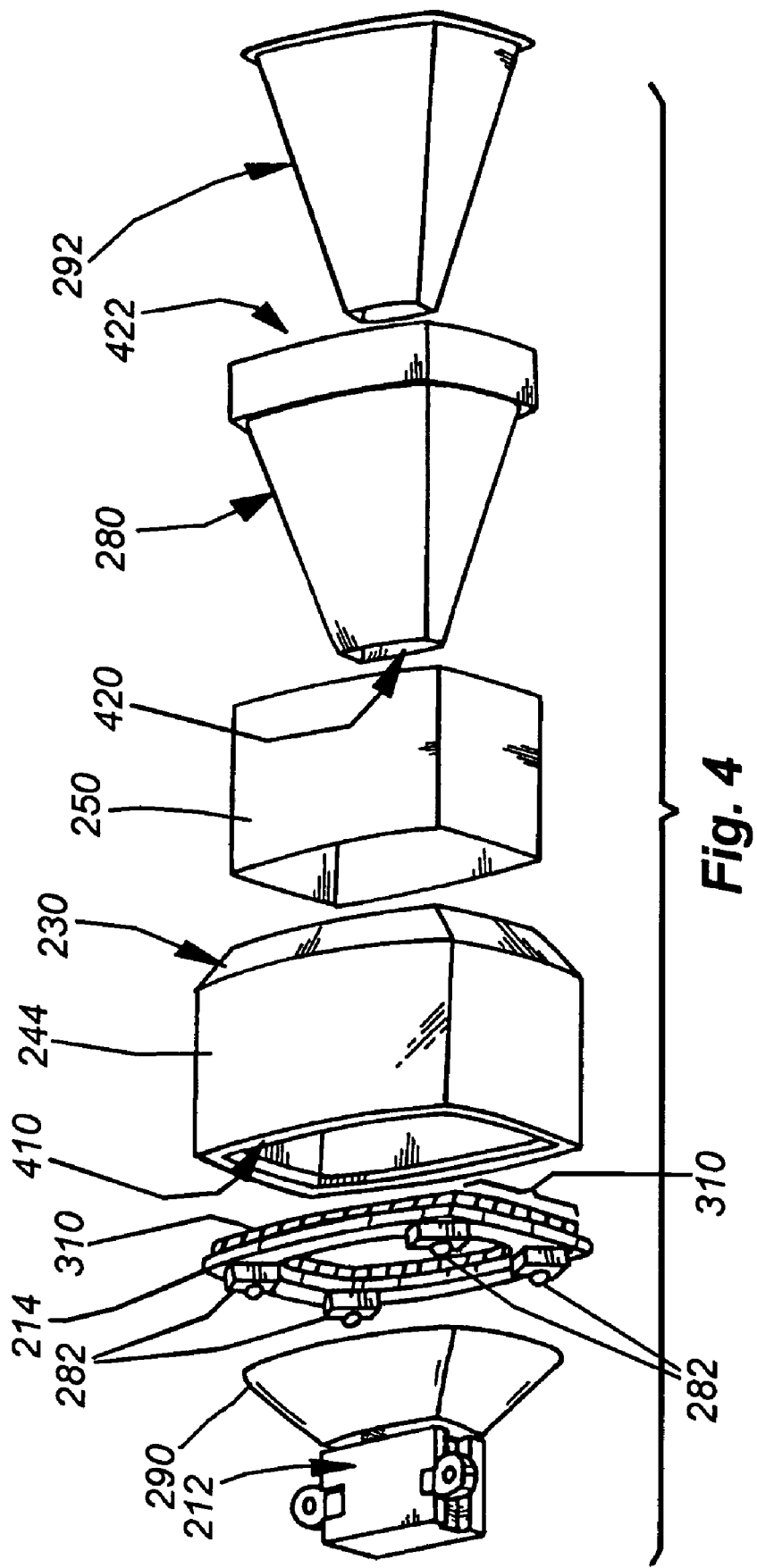
FIG. 4 is an exploded view of the illumination assembly and image sensor for the scanning system of FIG. 2.

Reference is now also made to the exploded view of FIG. 4, which further details the components of the overall illuminator assembly with respect to the imager 212. As shown, the various illuminator assembly components, described above have been separated to reveal individual structural details. The imager 212 resides at the left side of the view. The illumination board assembly 214 is located ahead of it. Placed in front of the illumination board 214 and LEDs 310 is the proximal (or base) end 410 of the light pipe 244, which receives transmitted light from the LEDs 310, and internally transmits it to the chamfered distal end 230. A tapered (also loosely termed "conical") diffuser 280 (refer also to FIG. 2) is nested within the light pipe 244, with a narrowed proximal opening 420 provided adjacent to the imager 212 and a widened distal opening 422 located at the opposing end. In an illustrative embodiment, this diffuser 280 can be constructed from a thin (1-3 millimeter) polymer material with a frosted interior. As noted above, a thin shield 250 is provided against the interior of the light pipe to block the diffuser's transmitted light from entering the light pipe 244. In this manner, the light emitted from the diffuser does not mix with the light pipe's transmission. The light projected by the diffuser is provided by a set of (four) rearward-projecting LEDs 282 mounted on the illumination board 214 on a side opposite the light pipe LEDs 310. These LEDs (282) project rearward into a parabolic (or other shape) reflector 290 that spreads the reflected light throughout the inner surface of the diffuser 280 so that it exits as a substantially uniform spread of direct, diffuse light onto the surface of interest. In this embodiment, the reflector is constructed from polymer with a white textured surface to further diffuse the light reflected therefrom. This aids in reducing the number of diffuse illumination LEDs 282 employed to project the diffuse illumination, thereby reducing production costs and power consumption. Also in this embodiment, the diffuse illumination LEDs 282 are high-output blue LEDs. It is recognized that a significant wavelength spread exists between red LEDs (transmitting the direct bright and dark field illumination in this embodiment). Thus, this wavelength spread allows the resolution of diffuse illumination on a surface from the dark field/direct bright field on the surface as will be described in detail below. The particular colors used for each type of illumination are highly variable. However, it is highly desirable that the diffuse illumination be spaced apart on the spectrum sufficiently from the dark field illumination to allow adequate resolution of the two wavelengths of light.

To further ensure that diffuse light and dark field light do not mix within the light pipe or diffuser, a translucent "conical" filter 292 is provided. The filter 292 is adapted to filter out light with larger wavelengths, thereby allowing smaller wavelength blue light to pass out of the diffuser and onto the surface, but preventing the retransmission of any reflected red light from the surface, which would otherwise tend to become retransmitted as diffuse red light along with the red dark field illumination. The filter 292 conforms to the shape of the diffuser's outer (exposed) surface, and can be snapped or adhered onto the diffuser surface using a variety of fastening techniques that should be clear to those of ordinary skill. Note that instead of a separate filter 292, a similar effect can be obtained through the use of a colored diffuser (see FIG. 6 below). The color should be selected so that the diffuser transmits the diffuse light (blue in this embodiment), but does not reflect the dark field light (red in this embodiment) transmitted from the light pipe. Various improvements to the light pipe and diffuser are further described in commonly assigned U.S. patent application entitled INTEGRATED ILLUMINATION ASSEMBLY FOR SYMBOLOGY READER, by Laurens W. Nunnink, filed on even date herewith and the teachings of which are expressly incorporated herein by reference.

Thus, to summarize, at least two discrete sets of illumination transmitters (LEDs, for example) are provided according to the illustrative embodiment, the direct diffuse to transmitters 282 and the dark field transmitters 310. In accordance with the illustrative embodiment, each discrete set of transmitters 282 and 310 generates a corresponding discrete illumination color. For example, direct diffuse illumination can be generated by blue LEDs and dark field (and direct bright field) can be generated by red LEDs. Because the image sensor used herein is a commercially available color sensor, each pixel in the sensor's pixel array is assigned a particular color sensitivity. In a common arrangement, certain sensor pixels comprise a red pixel, certain pixels are green pixels and other pixels are blue pixels. The pixels are grouped in proximity so that the sensor receives at least one red, one green and one blue pixel data from each point on the sensor. This has the effect of producing an overall continuum of differing-intensity red, green and blue data that collectively mix in different intensities to define an overall color image across the sensor array. A typical technique for creating a color pixel array is to apply a mosaic color filter over a monochrome sensor. The filter renders particular pixels sensitive to particular colors. As a point of interest and by way of further background, a popular pixel pattern is the so-called Bayer pattern, shown for part of an array below (in which R is a red sensitive pixel, G is a green sensitive pixel and B is a blue sensitive pixel):

| R | G | R | G |
|---|---|---|---|
| G | B | G | B |
| R | G | R | G |
| G | B | G | B |

It therefore follows that each discrete pixel senses only the light from one of the corresponding illumination sources. This allows the single-color image formed by each type of illumination to be discriminated in a manner described in further detail below. Note that while, green illumination is not used, in alternate embodiments it can be transmitted (for example, by a separate direct bright field illuminator), and sensed by green pixels. However, it should be noted that blue pixels often have some sensitivity to green and the spread between red and blue is most effective for resolving different images from different discrete illumination sources.

Figure 5:
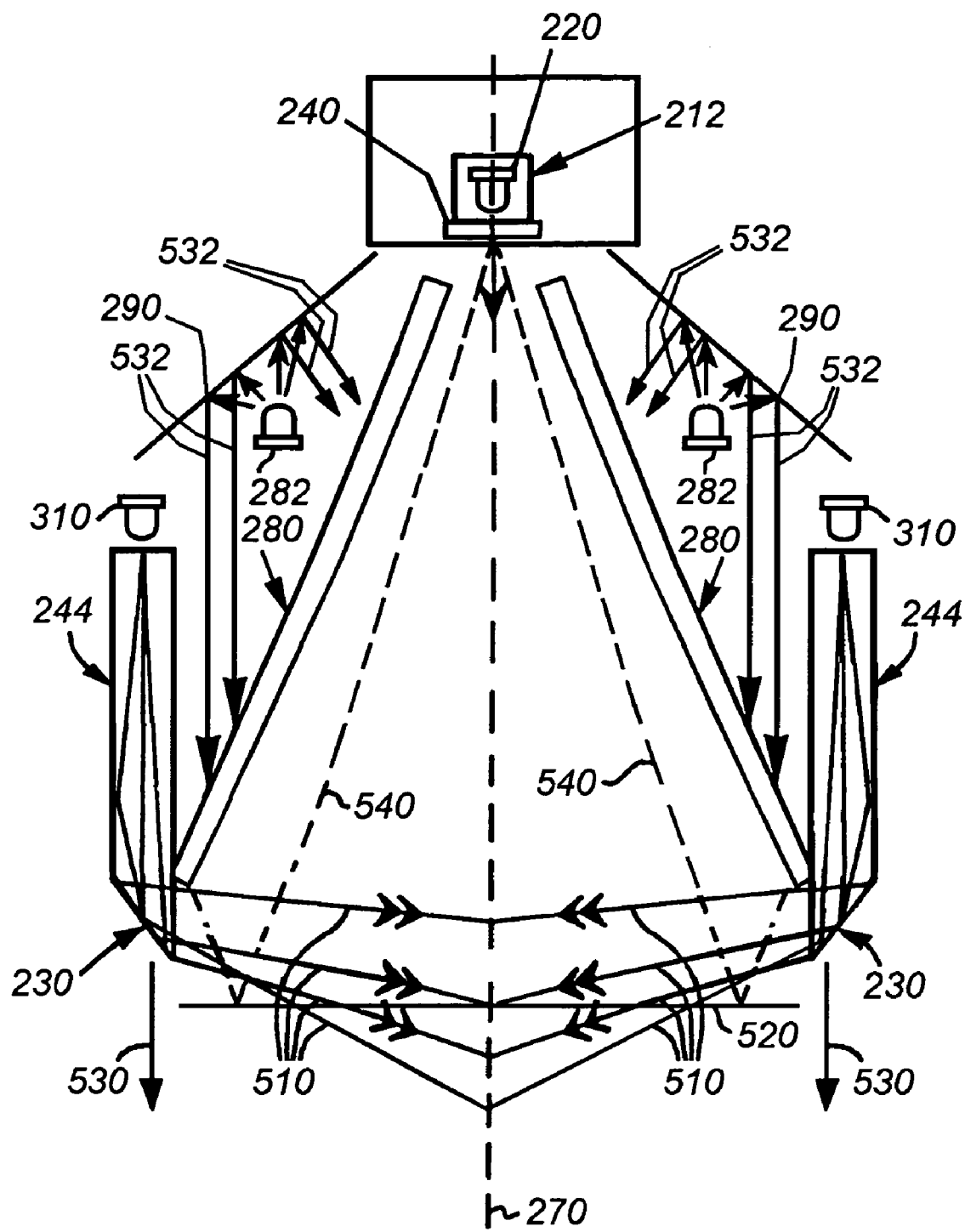
FIG. 5 is a somewhat schematic side cross section of the sensor and illuminator assembly for use with the scanning system of FIG. 2 according to a first embodiment.
Figure 6:
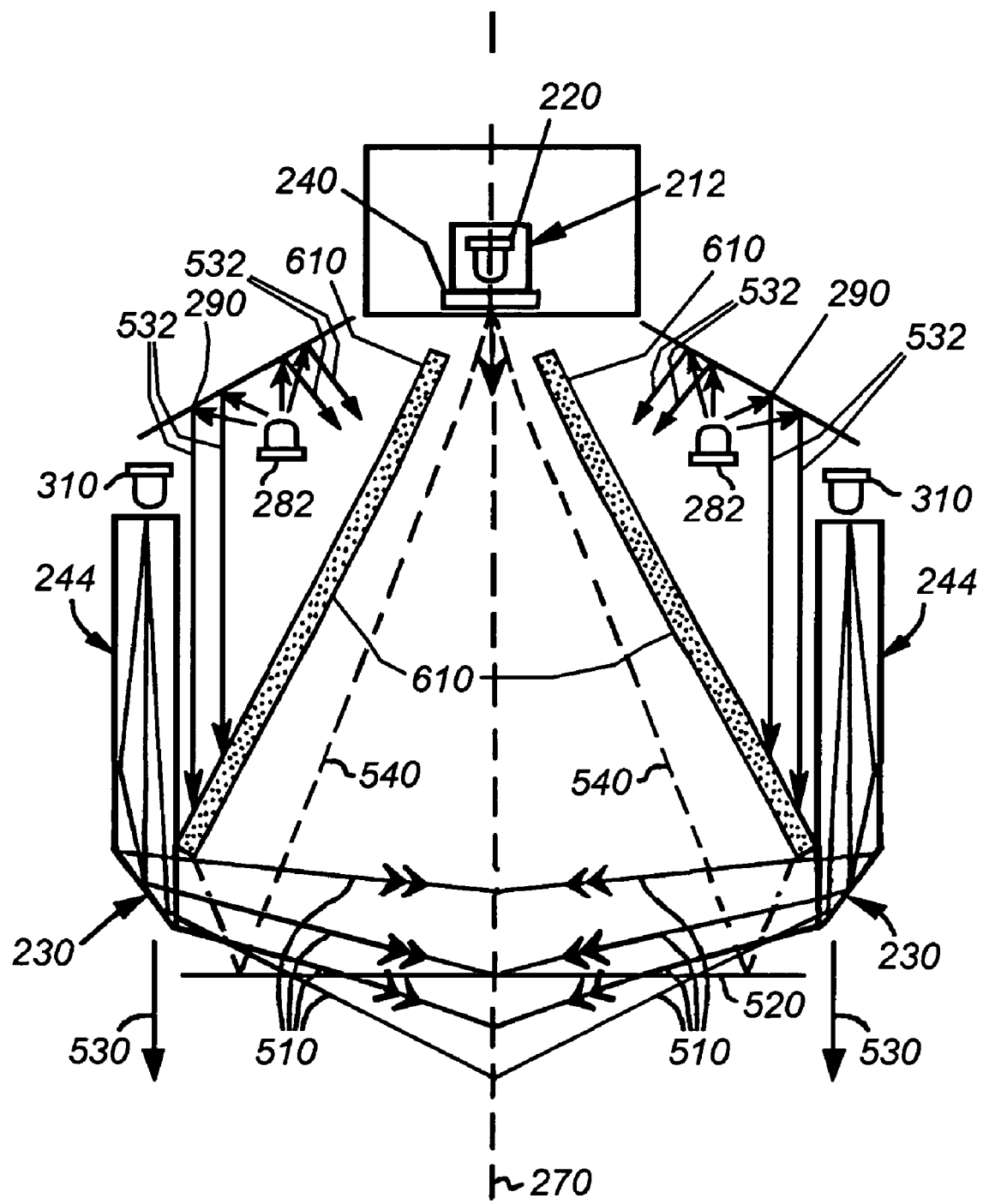
FIG. 6 is a somewhat schematic side cross section of the sensor and illuminator assembly for use with the scanning system of FIG. 2 according to a second embodiment.

Before further describing the novel discrimination of color images by the reader according to this invention, reference is now made to FIGS. 5 and 6, which each show a particular embodiment of the illumination assembly of the reader 200 according to this invention. FIG. 5 details a cross section of an implementation of the diffuser 280 with light pipe 244 as described generally above, relative to the imager assembly 212 (and associated lens structure 240), which provides direct diffuse illumination in combination with dark field illumination. Dark field illumination (rays 510) is directed into the light pipe 244 that is internally reflected at the chamfered distal end 230 to be, thus, directed at the object surface 520 at a low angle. Further information regarding the basic design and implementation of passive light pipes with selectively actuated illumination to provide dark field illumination can be found in the above-incorporated U.S. patent application Ser. No. 10/693,626, entitled LIGHT PIPE ILLUMINATION SYSTEM AND METHOD, by William H. Equitz, et al. Direct illumination (rays 532) from blue LEDs 282 is converted into totally diffuse direct illumination by reflection off the reflector 290, and passage into and through the diffuser 280 of this embodiment. The diffuser 280 thereby projects diffuse illumination on the object surface 520 within the field of view, depicted as the region defined by dashed lines 540. In this embodiment the diffuser 280 is, itself, translucent, without a color tint or color-filtering effect. It should be noted that the diffuser 280 according to this embodiment, and other embodiments described herein, can be constructed and arranged so as to be removably attached to the hand held scanning appliance. In one example, the diffuser can be removed to allow the transmitters 282 to operate as non-diffuse direct bright field illumination. Alternatively, the diffuser can be provided with movable shutters that selectively expose clear (non-frosted/non-diffusing) windows in the overall diffuser. The removability of the diffuser 280 can be achieved by incorporating snap-fit clearances and/or features in the diffuser and light pipe 244 that permit removable assembly (not shown).

In this embodiment (FIG. 5) direct non-diffuse bright field illumination (arrows 530) is provided by refraction of light through the chamfered end 230 of the light pipe 244. The light pipe can be modified in alternate embodiments to include a flattened ring (residing in a plane perpendicular to the axis 270. This would permit additional bright field light to be directly transmitted onto the surface 520. Likewise, a nested light pipe with a flat (unchamfered) ring formed at its distal end can be used in alternate embodiments for direct transmission of bright field light along a waveguide separate from the depicted dark field light pipe 244. This can be useful where illuminators having a discrete color are used for direct bright field light. Alternatively, where optional direct bright field transmitters are employed they can be located so as to project light through clear/transparent portions (not shown) of the diffuser 280.

While not shown in this illustration for simplicity, it can be assumed that a filter (292 above) may be applied over the diffuser to prevent migration of reflected dark field (and bright field) light into the diffuser 280. Such a filter is also omitted from the illustration of—but may be applicable to—the embodiment described in FIG. 6 below.

FIG. 6 shows a cross section of an alternate embodiment of the implementation of a conical/tapered diffuser 610 for use with the reader 200 and light pipe 244 of this invention. Note that like components and features are given like reference numerals to those appearing in FIG. 4. In this embodiment, the diffuser 610 is fabricated with a color-tinted/color-transmissive material having a color characteristic different from the color (red, for example) of the color-specific dark field illumination 510. Hence the diffuser acts as a color filter, and may allow the rearward-projecting LEDs 282 to be white, instead of specific color (blue, for example) LEDs. The resulting transmitted diffuse light is filtered to project only the desired color from the diffuser 610. Also, in this embodiment, the color-tinted diffuser 610 receives any scattered illumination reflecting from the object surface 520 and generally prevents such reflected light from being retransmitted via the diffuser as totally diffuse direct illumination because the color is different. It should be noted that the LEDs 282 may transmit white light or colored light (blue for example) in this embodiment. The color-tinted diffuser will either filter all but blue light from white LEDs or will allow the colored (blue) light from the LEDs to pass through the diffuser material. Conversely, the above-described separate filter (292) can be employed with White LEDs or the appropriate, matched colored LEDs. In general, colored LEDs are typically desired as they allow more of the total light output to be transmitted through the diffuser/filter that a white LED (wherein a good portion of the output spectrum is attenuated).

Figure 7:
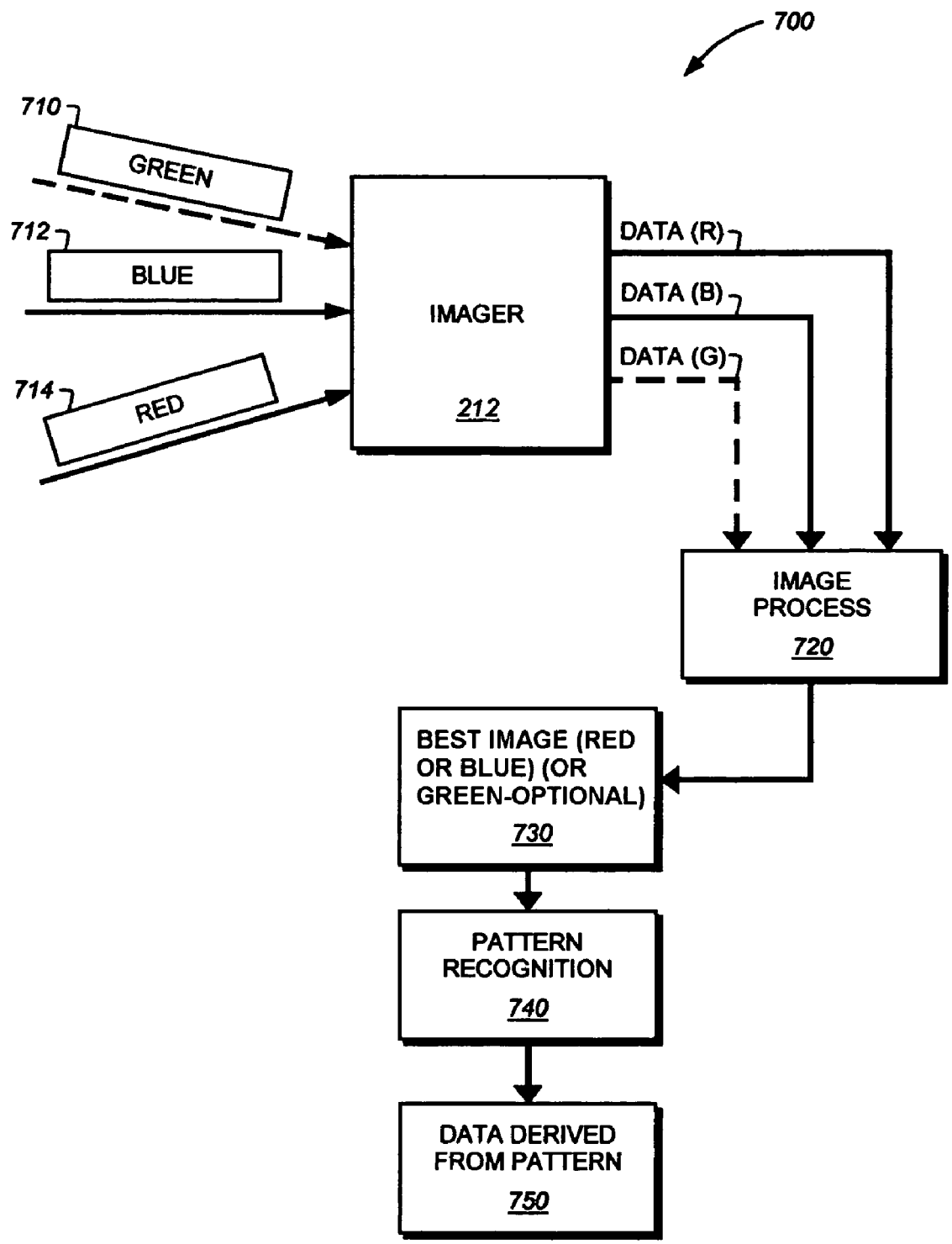
FIG. 7 is a block diagram of a three-color image-processing arrangement for use with the scanning system of FIG. 2.

Having described the general properties and construction of an illumination assembly according to various embodiments, reference is now made to FIG. 7, which schematically illustrates a schematic block diagram of the reader's image processing function 700 according to an embodiment of this invention. The optical image data from three simultaneously created images, a red dark field image 714, a blue direct diffuse image 712 and a green direct bright field image 710 are acquired by the imager. Because the imager's sensor contains pixels that are variously sensitive to particular colors (red, blue and green in this example), the sensor can resolve the intensity data at each pixel, identifying whether that pixel is a red-sensitive, blue-sensitive or green-sensitive pixel. The resulting pixel data contains addresses or other identifiers that are known to those of ordinary skill, which can be resolved independently as red pixel data DATA(R), blue pixel data DATA(B) and green pixel data DATA(G). Each form of data is fed to a software and/or hardware image process 720. The best image process employs a variety of known image analysis tools, such as a contrast tool to determine which of the red or blue data (green data being unused and optional, as shown by dashed line on Data(G)) data provides the best (clearest and most-readable) image throughout its entire area. The best image is then selected by the image process and provided as image data 730 to a pattern recognition process 740 that can be conventional in the art. This process produces meaningful data 750 such as an alphanumeric code, etc. that can be used by downstream data processing devices for inventory control, etc.

Figure 8:
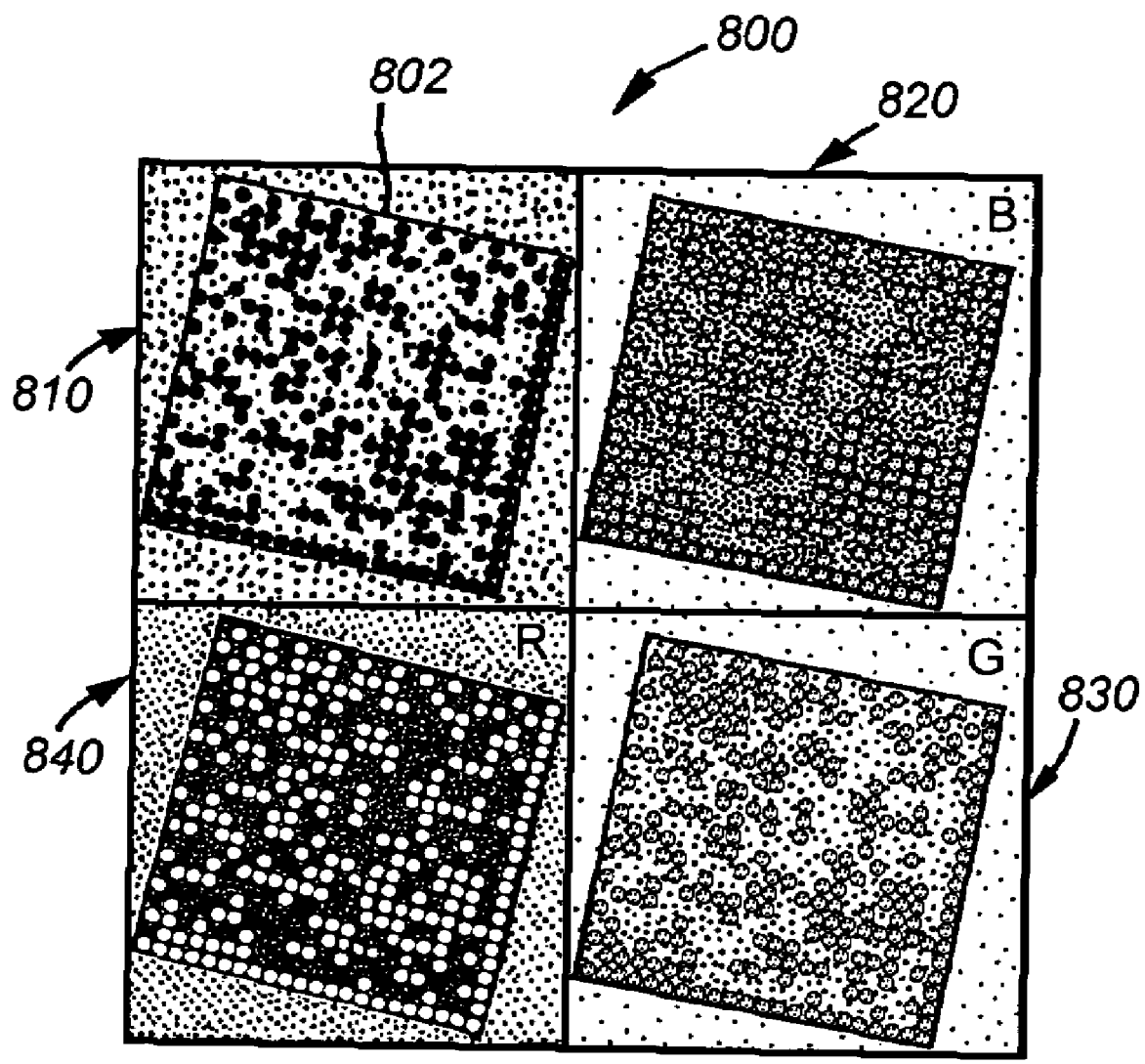
FIG. 8 is a diagram of a set of simultaneous images resolved using the illumination and image processes in accordance with this invention.

By way of an example of the process described in FIG. 7, FIG. 8 shows an exemplary image 800 of a dot-peened (two-dimensional-barcoded) surface 802. The image 810 is a full-color image with blue (diffuse) green and red (dark field) illumination all contributing. This image is somewhat fuzzy and would be difficult to decode without applying a variety of analysis tools, consuming both time and resources.

The blue (diffuse image) 820 can be separately resolved from appropriate blue pixels of the sensor. This image has moderately good contrast. Predictably (with a peened surface), the image 830 resolved from the green pixels displays the least contrast as it is derived mainly from blue light. This green image is unused in this embodiment. The red pixels, however, deliver a high-contrast between peened and unpeened surface details in the red image 840. This depicted image appears as if dark field illumination was used exclusively, but in this case direct diffuse illumination was also present, but not resolved in the image 840. The process would likely select this resolved dark field image (840) as the best for analysis and deliver it to pattern recognition for decoding.

Clearly a significant advantage of the reader and process described herein is that the user need not select the best form of illumination, or reorient the scanner to obtain the best image. Rather, the scanner automatically applies all three types of illumination at once and acquires a single image using all types of illumination. Since one image is required, the three different colors are perfectly aligned so there is no need to apply complex translation functions to realign the images. This is desirable, in part where, in an alternate embodiment, a plurality of discrete color images are analyzed to decode the pattern. This feature may be desirable when a particular image contains more than one type of surface characteristic. For example half of the surface of interest may be printed and the other half of the surface may be peened. The part of each image showing the best contrast for a particular area is chosen to transmit to the pattern recognition process. Since these images are all registered (each color pixel data is an identifiable location on the sensor array, the particular color pixel data (only one pixel per sensor array location) with its intensity value can streamed to the pattern recognition process in the manner of a grayscale image. The pattern recognition process need not be concerned with the original color of the pixel, only what that color's intensity is. The best image process chooses the pixels displaying the best contrast and only those pixels are transmitted.

According to further embodiments, it is contemplated that the techniques for color illumination and image filtration described herein with reference, for example, to FIG. 7 can be extended and adapted to allow for elimination of reflections from a specular surface. In one implementation illumination of differing colors can be projected from different directions, but otherwise be of the same illumination type. Referring to FIG. 3, the LEDs 310 on each of the four depicted quadrants 320, 322, 324 and 326 of the light pipe can employ a different color (for example, red, green, blue, with one color repeated on two quadrants) or simply red on two adjacent quadrants (or opposing) and blue on the other two quadrants. In a typical operational example, specular reflections will be received by the imager in one color, but not the other two (or three). The process then filters out reflections by comparing the clarity of the image on each of the color channels and selecting the channel(s) with the best image. Note that variable colors can be provided to each quadrant so that the entire light pipe can project a single color when desired.

Likewise, in an embodiment, opposing quadrants (320 and 324), (322 and 326) can be provided with different color LEDs (red and blue) or variable colors. In this manner, reflections caused by surface texture of the subject surface can be eliminated. This would entail filtering all or portions of a color image that are not clear and selecting unreflected portions for data recognition.

Figure 9:
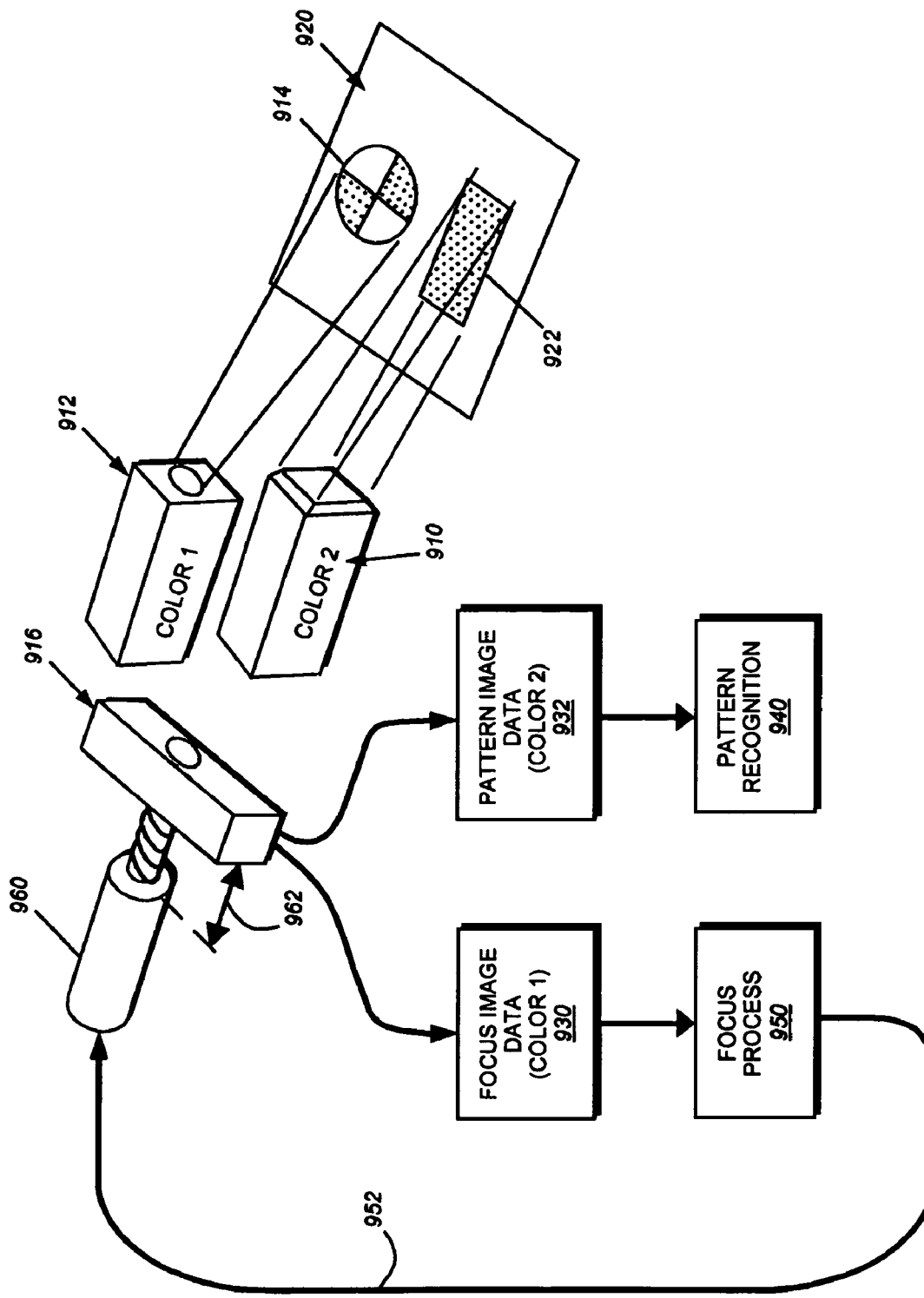
FIG. 9 is a schematic diagram of an embodiment of an automatic focus mechanism using a color focusing target for a reader such as that shown in FIG. 2.

According to yet another embodiment, the ability to filter discrete colors via discrete color-sensitive sensor pixels can be employed to allow distance measurement and automatic focus of the lens for distance simultaneously with pattern acquisition so that the reader need not be held stationary after initial focus so that an image can be acquired. FIG. 9 schematically shows an implementation of an automatic focus arrangement for a reader such as that (200) shown in FIG. 2. The implementation employs an illuminator assembly 910 that can be structurally and operationally similar to that generally described hereinabove. Integrated with the illuminator assembly, or mounted separately is a focus pattern projector 912. The focus pattern projector projects a predetermined pattern 914 at a convenient and known position on a surface 920 with respect to the field of view of the imager 916. The pattern is any acceptable pattern that can be defined in one color. This color is termed COLOR 1 it can be red, blue, green or another resolvable color as described herein. The main illumination assembly 910 projects illumination onto the area of interest (pattern 922) in a color different from COLOR 1. As described above, multiple colors may be used in the illumination assembly 910 for respective illumination types such as direct diffuse and dark field/direct bright field.

The imager receives images in each of the discrete colors and transmits the pixel data from each color as image data. While the entire field of view is acquired, COLOR1 pixels will mainly show intensities for the focus pattern (data 930). Likewise, Pattern data provide intensities in COLOR 2 (and other colors provided by the illumination assembly 910) (data 932). The image data 932 is resolved by pattern recognition processes 940 into one or more readable images that are decoded for their data content or other information. The focus image data 930 is analyzed by a focus process 950 that may loop back to an electronic or electromechanical focus mechanism 960 that manipulates (double arrow 962) the imager to achieve desired focus on the surface. The focus processes may perform a plurality of quickly iterative cycles in order to produce the desired focus, at which time the pattern 922 is acquired for a well-focused image.

To again summarize, the above-described reader and process affords quicker image analysis, greater accuracy and increased versatility. It allows more flexibility in types of surfaces being scanned and the angles at which the reader is held relative to the surface. Moreover, since color image sensors are presently becoming less expensive than grayscale sensors of the same resolution, the overall cost of producing a reader according to this invention may decrease.

The foregoing is a detailed description of illustrative embodiments of the invention. Various modifications and additions can be made without departing from the spirit and scope thereof. For example, the placement and colors of various transmitters is highly variable. Additional colors and/or wavelengths of light can be provided for further illumination types. While the colors red, green and blue are employed for particular types of illumination, one skilled in the art will appreciate that alternative color characteristics, such as red/infrared or cyan, magenta and yellow and can be employed according to the any of the embodiments contemplated. Appropriate functions in the reader can be established to recognize, read and process these particularized wavelengths instead of, or in addition to the illumination colors described above. Further, while the embodiments shown herein relate to a handheld scanner, it is expressly contemplated that the principles described herein can be applied to a fixed scanner and the terms "reader," "scanner" and the like should be taken broadly to include fixed units. Also, any of the processes or steps described herein can be executed by elements in the handheld reader, a linked computing device or another device. In addition, while colored LEDs are used to generate the desired dark field illumination, the color can be generated alternatively using a colored filter and/or tinted light pipe combined with white LEDs in the ring source. Finally, it is expressly contemplated that any of the processes or steps described herein can be implemented as hardware, software, including program instructions executing on a computer, or a combination of hardware and software. Accordingly, this description should be taken only by way of example and not to otherwise limit the scope of the invention.

What is claimed is:

1. A system for scanning a surface comprising:
    an imager having image sensor pixels that each acquire images in each of at least a first image color and a second image color;
    a focuser that varies focus of the imager with respect to the surface;
    an illumination assembly constructed and arranged to simultaneously provide a first illumination type in a first illumination color recognized by the imager as the first image color and a second illumination type in a second illumination color recognized by the imager as the second image color, and a focus pattern, projected on the surface, in a focus illumination color recognized by the imager as the focus image color; and
    a focus process that reads image pixel data from the imager in the focus illumination color and that controls the focuser based upon the image pixel data in the focus illumination color.

2. The system as set forth in claim 1 wherein the first illumination type comprises dark field illumination and the second illumination type comprises direct diffuse illumination.

3. The system as set forth in claim 2 wherein the illumination assembly includes a light pipe having a chamfered end that projects the first illumination color onto the surface and a diffuser mounted within the light pipe that projects the second illumination color onto the surface.

4. The system as set forth in claim 3 wherein the diffuser includes an optical filter that prevents reflection therefrom of the first illumination color.

5. The system as set forth in claim 4 wherein the first illumination color is red and the second illumination color is blue.

6. The system as set forth in claim 4 wherein each of the first illumination color and the second illumination color are each produced by a plurality of respective first LED transmitters and second LED transmitters that, respectively, emit the first illumination color and the second illumination color.

7. The system as set forth in claim 6 wherein each of the first illumination color and the second illumination color are defined by wavelengths that are visible light.

8. The system as set forth in claim 2 wherein at least one of the first illumination color and the second illumination color is produced by white light transmitted from LEDs and passed through a filter that transmits the at least one of the first illumination color and the second illumination color respectively.

9. The system as set forth in claim 1 wherein the image sensor pixels each acquire images in a least a third image color, the illumination assembly is constructed and arranged to provide, simultaneously with the first illumination color and the second illumination color, a third illumination type in a third illumination color recognized by the imager as the third image color.

10. The system as set forth in claim 9 wherein the first illumination type comprises dark field illumination, the second illumination type comprises direct diffuse illumination, and the third illumination type comprises direct bright field illumination.

11. The system as set forth in claim 1, further comprising a best image process that determines whether a best image for pattern recognition is provided in one of either the first image color or the second image color.

12. The system as set forth in claim 11 further comprising a pattern recognition process that receives imager pixel data from the best image process and decodes the best image into data therefrom.

13. The system as set forth in claim 12 wherein the pixel data received by the pattern recognition process defines the best image comprising a plurality of areas, each composed of a discrete image color of the first image color and the second image color.

14. The system as set forth in claim 12 wherein the best image process determines which pixels provide the best image based at least upon contrast.

15. The system as set forth in claim 12, wherein the first illumination type comprises dark field illumination and the second illumination type comprises direct illumination.

16. The system as set forth in claim 12, wherein the image sensor pixels each acquire images in a least a third image color, the illumination assembly is constructed and arranged to provide, simultaneously with the first illumination color and the second illumination color, a third illumination type in a third illumination color recognized by the imager as the third image color and the best image process further determines whether a best image for pattern recognition is provided in one of either the first image color, the second image color or the third image color.

17. A method for scanning a surface comprising the steps of:
    acquiring images with image pixels of an imager in each of at least a first image color and a second image color;
    varying focus of the imager with respect to the surface;
    simultaneously providing a first illumination type in a first illumination color recognized by the imager as the first image color and a second illumination type in a second illumination color recognized by the imager as the second image color, and a focus pattern, projected on the surface, in a focus illumination color recognized by the imager as the focus image color; and
    reading image pixel data from the imager in the focus illumination color; and controlling focus based upon the image pixel data in the focus illumination color.

18. The method as set forth in claim 17 wherein the first illumination type comprises dark field illumination and the second illumination type comprises direct diffuse illumination.

19. The method as set forth in claim 18 further comprising projecting the first illumination color through a light pipe having a chamfered end that projects the first illumination color onto the surface and projecting the second illumination color through a diffuser mounted within the light pipe that projects the third illumination color onto the surface.

20. The method as set forth in claim 19 further comprising providing, in conjunction with the diffuser, an optical filter that restricts reflection of light of the first illumination color.

21. The method as set forth in claim 17 wherein the first illumination color is red and the second illumination color is blue.

22. The method as set forth in claim 17 further comprising producing each of the first illumination color and the second illumination color by a plurality of respective first LED transmitters and second LED transmitters that, respectively, emit the first illumination color and the second illumination color.

23. The method as set forth in claim 22 wherein each of the first illumination color and the second illumination color are defined by wavelengths that are visible light.

24. The method as set forth in claim 17 further comprising determining whether pixels provide a best image for pattern recognition in the first image color or in the second image color.

25. The method as set forth in claim 24 further comprising receiving pixel data from the step of determining and decoding the best image into data therefrom.

26. The method as set forth in claim 25 wherein the pixel data received by the step of decoding defines the best image comprising a single image color of the first image color and the second image color.

27. The method as set forth in claim 25 wherein the pixel data received by the step of decoding defines the best image comprising a plurality of areas, each composed of a discrete image color of the first image color and the second image color.

28. The method as set forth in claim 25 wherein the step of decoding determines which pixels provide the best image based at least upon contrast.

29. The method of claim 25, wherein the first illumination type comprises dark field illumination and the second illumination type comprises direct illumination.

30. A system for scanning a surface and deriving data therefrom comprising:
    an imager that receives image data in at least three discrete image colors, each of which colors is resolvable into a discrete image color data stream;
    an illuminator that simultaneously projects on the surface at least three illumination colors corresponding substantially to at least three image colors, each of the three image colors respectively being projected in a first illumination type, a second illumination type and a third illumination type; and
    a best image process that derives that image color stream displaying the best image from each discrete image color data stream.

31. The system as set forth in claim 30 further comprising a pattern recognition process that receives the discrete color image stream that is the best image and decodes the discrete color image stream into data represented by the surface.

32. The system as set forth in claim 30 wherein the first illumination type and the second illumination type each comprise illumination oriented to produce reflections from a surface that are directed differently from each other.

33. The system as set forth in claim 32 wherein each of the first illumination type and the second illumination type comprise dark field illumination.

34. The system as set forth in claim 30 wherein the first illumination type comprises dark field illumination and the second illumination type comprises direct diffuse illumination.

35. The system as set forth in claim 30 further comprising a pattern recognition process that receives imager pixel data from the best image process and decodes the best image into data therefrom.

36. The system of claim 35, wherein the first illumination type comprises dark field illumination and the second illumination type comprises direct illumination.

* * * * *